Dec. 25, 1923.
A. GRAVEL
1,478,387
BODY CONSTRUCTION FOR MOTOR VEHICLES
Filed Dec. 15, 1917
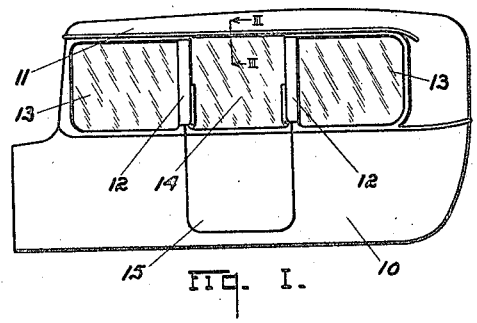
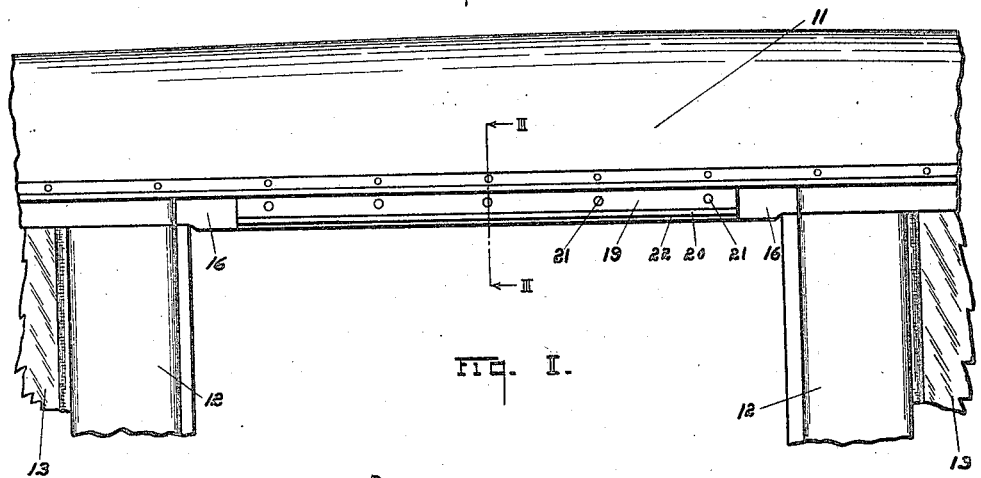
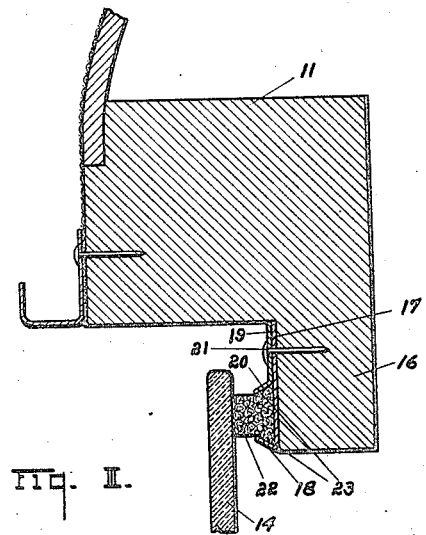
Inventor
Abundius Gravel
By Chester H. Braselton
Attorney Patented Dec. 25, 1923.

1,478,387

UNITED STATES PATENT OFFICE.

ABUNDIUS GRAVEL, OF TOLEDO, OHIO, ASSIGNOR TO THE WILLYS-OVERLAND COMPANY, OF TOLEDO, OHIO, A CORPORATION OF OHIO.

BODY CONSTRUCTION FOR MOTOR VEHICLES.

Application filed December 15, 1917. Serial No. 207,299.

*To all whom it may concern:*

Be it known that I, ABUNDIUS GRAVEL, a citizen of the United States, residing at Toledo, in the county of Lucas and State of Ohio, have invented certain new and useful Improvements in Body Constructions for Motor Vehicles, of which I declare the following to be a full, clear, and exact description.

This invention relates to improvements in door and window construction for closed motor vehicles.

The principal object of this invention is to provide an improved weather strip construction for use at the upper edges of the sliding windows used in the door construction in connection with sedans or other enclosed motor vehicles.

Further objects, and objects relating to details of construction and economies of manufacture, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure I is a view in side elevation of a motor vehicle body embodying my invention.

Figure II is an enlarged, fragmentary view in side elevation, corresponding to a part of Fig. I, showing the window dropped into the pocket in the door.

Figure III is an enlarged, detail, sectional view, taken substantially on the line III—III of Figs. I and II.

In the drawings, similar reference numerals refer to similar parts throughout the several views, and the sectional view is taken looking in the direction of the little arrows at the ends of the section line.

Considering the numbered parts of the drawing, I have shown a motor vehicle body 10 having a top 11, the top and body being connected by the pillars 12. The windows 13 are mounted in the body portion and are slidable into position between the top 11, and the body 10, and between the pillars 12, and sliding windows 14 are provided, which, when lowered, drop into pockets provided in the doors 15.

My invention has to do with the construction of a weather strip for closing the joints between the top 11 and the upper edges of the sliding windows 14, which have no sash in order to prevent obstruction of the vision when the window is partly lowered. The rail around the top 11 has a flange 16 extending downwardly in the rear of the top edge of the window 14, when in raised position, as clearly shown in Fig. III. A strip 17 is secured to this flange 16, and the lower edge of the strip 17 has a flange 18 extending upwardly at an angle of approximately 60 degrees therefrom. A shorter strip 19 is secured above the strip 17, and has, at its lower edge, a flange 20 extending from the strip 19 at an angle of approximately 120 degrees. These strips 19 and 17 are secured to the top rail portion 16 by means of nails or other fastening means 21. A strip of felt 22 is secured between the flanges 18 and 20, the base of the strip of felt having the laterally extending flanges 23, which are disposed beneath the flanges 18 and 20, so that, by this means, the strip of felt 22 is secured to the portion 16 of the top rail 11, and projects outwardly therefrom.

When the glass 14 is raised, in its uppermost position, it rests against the flexible strip of felt 22, so as to form a weather tight joint at the top of the window. It will be seen that, by this means, I have provided a very simple and effective manner of mounting a weather strip for the upper edge of the window, and one which is sightly in appearance and which may be very readily and quickly attached. Furthermore, this weather strip construction is such as to allow considerable tolerance in manufacture as it is not necessary that it be applied accurately, because of the flexible nature of the strip of felt, which will yield considerably when the upper edge of the window engages or pushes against it.

I am aware that the particular embodiment of my invention, which I have here shown and described, is susceptible of considerable variation without departing from the spirit thereof, and, therefore, I desire to claim my invention broadly, as well as specifically, as indicated by the appended claim.

Having thus described my invention, what I claim as new and desire to secure by Letters Patent, is:

The combination with a motor vehicle having a body including a top, said top being provided with a rail, of a door mounted to swing against said rail, a strip secured to said rail and provided with a flange extending upwardly from its lower edge and inclined at an angle to the body of said strip; a second strip secured to said portion above said first named strip, and provided with a lower flange extending at an oblique angle to the body of said strip, and a strip of felt having its base secured between said flanges, and a body portion projecting outwardly therefrom in position to be engaged by the upper edge of said door.

In testimony whereof I affix my signature.

ABUNDIUS GRAVEL.